United States Patent
Gleim et al.

(10) Patent No.: US 6,369,780 B2
(45) Date of Patent: *Apr. 9, 2002

(54) AUXILIARY DEFLECTION WINDING DRIVER DISABLING ARRANGEMENT

(75) Inventors: Gunter Gleim; Albert Runtze; Friedrich Heizmann, all of Villingen (DE)

(73) Assignee: Thomson Licensing S.A., Boulogne (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/409,492

(22) Filed: Sep. 30, 1999

(51) Int. Cl.⁷ .............................................. G09G 1/08
(52) U.S. Cl. ...................... 345/13; 348/806; 315/370
(58) Field of Search .................. 345/10, 12, 13, 345/14, 15, 16; 348/450, 744, 745, 747, 805, 806, 807; 315/368.11, 368.25, 370, 399, 403, 368.26

(56) References Cited

U.S. PATENT DOCUMENTS

| | | | |
|---|---|---|---|
| 4,365,305 A | * | 12/1982 | MacDonald et al. .......... 345/13 |
| 4,388,619 A | * | 6/1983 | Beck ........................... 345/13 |
| 4,422,019 A | | 12/1983 | Meyer |
| 4,635,117 A | | 1/1987 | Labb |
| 4,670,772 A | * | 6/1987 | Bolger ........................ 348/450 |
| 5,016,095 A | | 5/1991 | Kil |
| 5,194,783 A | | 3/1993 | Ogino et al. |
| 5,282,033 A | | 1/1994 | Gleim et al. |
| 5,345,280 A | | 9/1994 | Kimura et al. |
| 5,463,427 A | | 10/1995 | Kawashima |
| 5,488,271 A | | 1/1996 | Gleim |
| 5,671,025 A | | 9/1997 | Ryo |
| 6,014,168 A | | 1/2000 | Webb |
| 6,046,713 A | * | 4/2000 | Jamar .......................... 345/13 |
| 6,072,544 A | | 6/2000 | Gleim et al. |
| 6,084,646 A | | 7/2000 | Lee |
| 6,097,447 A | | 8/2000 | Kim et al. |
| 6,124,685 A | | 9/2000 | Toriu et al. |
| 6,128,048 A | | 10/2000 | Cho |

FOREIGN PATENT DOCUMENTS

JP         344514        12/1993

OTHER PUBLICATIONS

"A Fully Digital Convergence System for Projection TV" – M. Shiomi et al Consumer Products Research Center Hitachi Ltd. Yokohama, 244, Japan –Manuscript received June 8, 1990 –1990 IEEE.

"A Real Time Digital Convergence System Using Interpolation" C. G. Oh et al. Dept. of Electronics Engineering, Seoul, Korea Visual Media Business Samsung, Suwon, Korea –Manuscript Received June 10, 1996 IEEE.

"Full Digital Convergence System for HDTV", T. Tsurumoto, Sony Corp Tokyo, Japan –Manuscript received June 7, 1991 –1991 IEEE.

* cited by examiner

Primary Examiner—Regina Liang
(74) Attorney, Agent, or Firm—Joseph S. Tripoli; Harvey D. Fried; Sammy S. Henig

(57) ABSTRACT

In a video display, correction data for a digital convergence arrangement are stored in a first non-volatile memory. During power turn on procedure, the correction data are read out of and stored in a volatile memory. During each deflection cycle, the data stored in the volatile memory are successively read out and applied to an auxiliary convergence winding. When a parity error is detected in the read out data, an output and/or an input of a convergence amplifier is actively disabled to prevent a disturbance of a screen of the cathode ray tube.

6 Claims, 1 Drawing Sheet

US 6,369,780 B2

AUXILIARY DEFLECTION WINDING DRIVER DISABLING ARRANGEMENT

The invention relates to a beam landing correction arrangement in a video display apparatus.

BACKGROUND OF THE INVENTION

The displayed image in, for example, a direct view video display or in a projection video display having a cathode ray tube (CRT), may suffer from beam landing location errors such as geometrical and misconvergence errors. It is known to correct such errors for a CRT using a digital dynamic convergence arrangement. Correction data stored in a memory are applied via a digital-to-analog (D/A) converter and a power amplifier to, for example, an auxiliary convergence winding. The amount of correction may vary dynamically in a given deflection cycle, in accordance with the location of the beam on the display screen.

In a video display, embodying an inventive feature, correction data are stored in a non-volatile memory that retains the correction data even when it is not energized. Upon power turn on, for example, the correction data stored in the non-volatile memory are read out and stored in a volatile memory. During each deflection cycle, the data stored in the volatile memory are successively read out and applied via a D/A converter to an auxiliary convergence winding.

Non-transient alteration of the correction data may occur in the non-volatile memory, as well as in the volatile memory, because of energy released in the event of a CRT arc discharge. The non-transient data alteration might occur when the arc discharge occurred simultaneously with the reading out of the correction data from the non-volatile memory.

In carrying out an inventive feature, each convergence data word includes a parity bit derived by check summing the data in the word that is read out of the volatile memory. The parity bit is used to sense data bit error in the read out data. A parity checking detector is used to calculate the parity bit using the present read out data bits from the volatile memory. When a parity error is detected, an output and/or an input of a convergence amplifier is actively disabled to prevent a disturbance of a screen of the CRT.

SUMMARY

A video display deflection apparatus, embodying an inventive feature, includes an arrangement for generating a deflection field in a cathode ray tube to vary a beam landing location of an electron beam of the cathode ray tube. A source of beam landing error correction data that are applied to the deflection field generating arrangement is provided for varying the deflection field by a variable amount that varies in accordance with the varying beam landing location. A disabling arrangement is coupled in a signal path of the beam landing error correction data for decoupling the beam landing error correction data from the deflection field generating arrangement to prevent the beam landing error correction data from varying said deflection field when abnormal operation conditions occur.

BRIEF DESCRIPTION OF THE DRAWING

The sole FIGURE illustrates, in a block diagram form, a deflection system of a projection television receiver, embodying an inventive feature.

DETAILED DESCRIPTION

Figure 1:
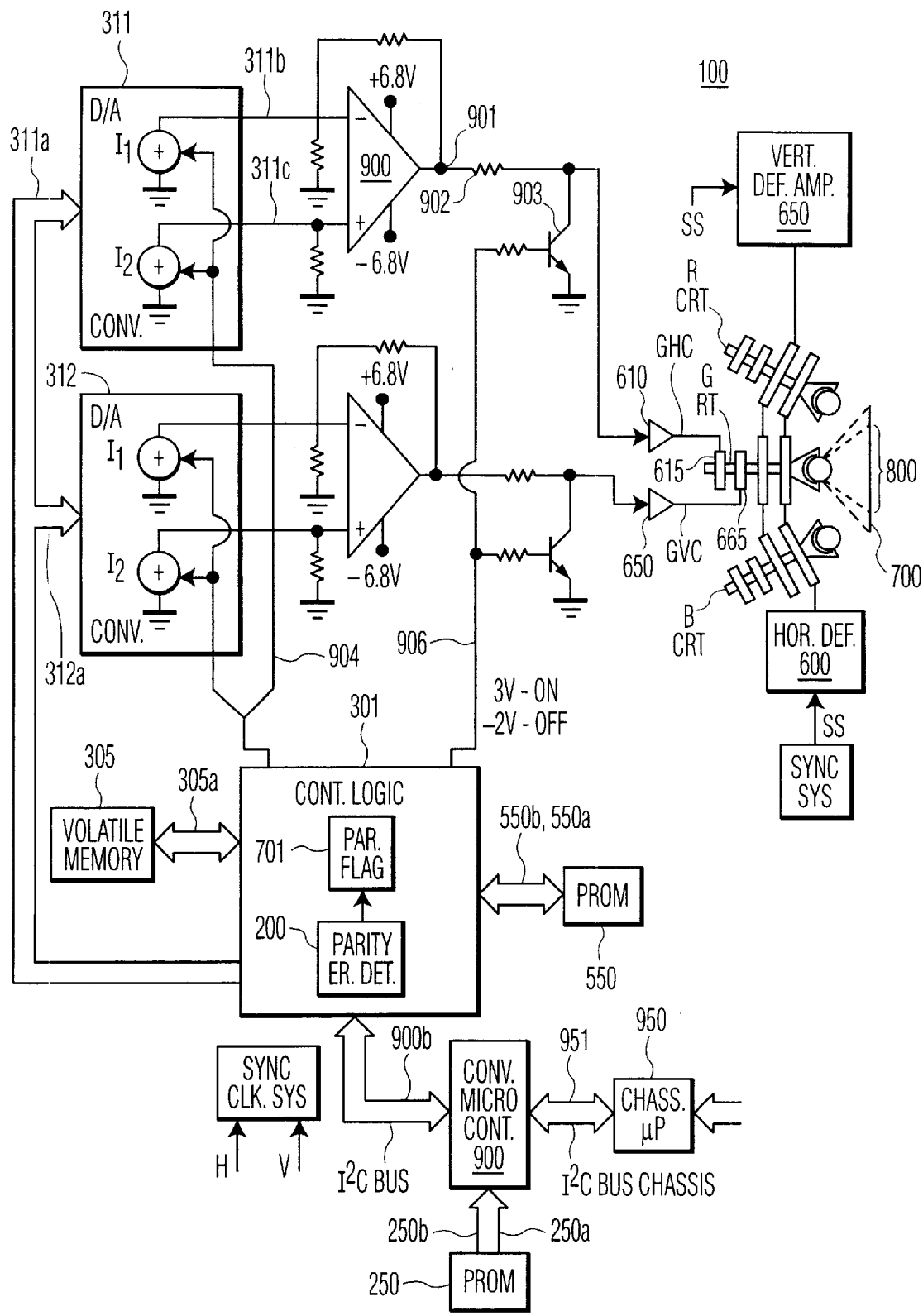

The sole FIGURE illustrates, in block diagram form, a deflection system 100 of a projection television receiver capable of multi-scan frequency operation, Deflection system 100 provides digital dynamic convergence, in accordance with an inventive feature. Three cathode ray tubes (CRT's), R, G and B form a combined image 800 on a screen 700. The deflection field in each CRT is controlled in a similar way. For example, CRT G is equipped with a horizontal deflection coil driven by a horizontal deflection output stage 600 and with a vertical deflection coil driven by a vertical deflection amplifier 650, conventionally constructed. CRT G is also depicted with an auxiliary horizontal convergence coil 615 driven by a horizontal convergence amplifier 610 and with an auxiliary vertical convergence coil 665 driven by a vertical convergence amplifier 660, conventionally constructed.

An digital-to-analog (D/A) converter 311 produces a differential output on a conductor 311b and on a conductor 311c. D/A converter 311 generates a current I1 on conductor 311b. Current I1 is equal to a reference value REF plus an analog current derived from a digital beam landing error correction data word 311 a. Similarly, D/A converter 311 generates a current I2 on conductor 311c. Current I2 is equal to reference value REF minus an analog current derived from digital beam landing error correction data word 311a.

Conductors 311b and 311c are coupled to inverting and to non-inverting input terminals, respectively, of a differential preamplifier 900. An output terminal 901 of amplifier 900 is coupled via a resistor 902 to a collector of a protection transistor 903 and to amplifier 610 and drives it with an analog signal derived from a digital beam landing error correction data word 311a. Similarly, a D/A converter 312 is coupled to amplifier 660 and drives it with an analog signal derived from a digital beam landing error correction data word 312a.

During the deflection cycle, Words 311a and words 312a are read out of a memory 305 via a controller or control logic circuit 301, in a conventional manner. Memory 305 forming a volatile memory space has a sufficiently fast access time for fetching successive words as the beam landing location varies on screen 700 to provide for dynamic convergence.

An electrically erasable programmable memory (EEPROM) 550 forming a first non-volatile memory space and containing digital beam landing error correction data words 550a is coupled to control logic circuit 301 via a bus 550b. Memory 550 includes, for example, four 2K byte memory spaces, not shown, for providing words 311a and 312a. The four 2K byte memory spaces are used, when stage 600 operates in a selectable horizontal scan frequency, 1H, 2H, 2.14H or 2.4H, respectively, where H is equal to 15,734 Hz.

During a mode set up occurring as part of a power up procedure or when a change of, for example, a horizontal scan frequency in horizontal deflection output stage 600 is required, data words 550a are read out of memory 550, and transferred via logic circuit 301 to memory 305. Thus, the duplicates of data words 550a are stored in memory 305. Thereafter, memory 305 contains the required values of digital beam landing error correction data words 311a and 312a for providing dynamic convergence, as explained before.

A convergence microprocessor 900 is coupled via an I²C bus 900b isolated from bus 550b and mastered by microprocessor 900. Microprocessor 900 controls logic circuit 301 for providing required control and data transfer functions associated with control logic circuit 301.

A back-up, non-volatile EEPROM 250 forming a second non-volatile memory space and containing factory adjusted digital beam landing error correction data words 250a is coupled to convergence microprocessor 900 via a bus 250b that is, advantageously, isolated from each of bus 550b and bus 900b. Data words 250a can be read out of EEPROM 250, transferred via microprocessor 900 and logic circuit 301 to memory 305 and, their duplicates stored in memory 550. Convergence microprocessor 900 is controlled by a main chassis microprocessor 950 via an I²C bus 951 that additionally serves various receiver sub systems.

In a factory set up procedure, screen 700 is viewed by a camera, not shown. Convergence error correction data words are stored in memory 305 and are adjusted until the displayed image meets tight screen position specifications. Duplicates of the data in memory 305 are then written to each of EEPROMs 550 and 250.

During CRT G arc discharge, non-transient alteration of correction data words 550a might occur in memory 550 because of the energy released in the arc discharge. Alteration of the correction data words might occur also in memory 305. The data alteration in memeory 550 seemed to happen intermittently when the arc discharge and the read out of the correction data words 550a from memory 550 occur simultaneously. Whereas, no data alteration has occurred when, during the occurrence of the arc discharge, data words are not simultaneously read out from memory 550. A data error correction procedure, embodying an inventive feature, is employed for substituting the error containing data in memory 550 with data free of errors.

Each convergence data word 311a and 312a read out of memory 305 has a parity bit, not shown, derived by check summing the data in the word that are read out from memory 305, during, for example, factory set up. These parity bits are used to sense a data error in each of read out data words 311a and 312a. A parity checking detector 200 is used to calculate the parity bits using the present read out data words 311a and 312a from memory 305. When a parity error is detected, a parity flag bit 701 is set in logic circuit 301. Flag bit 701 is monitored by convergence microprocessor 900. Chassis microprocessor 950 checks the status of flag bit 701 via microprocessor 900, for example, every 5 seconds.

In carrying out an inventive feature, If flag bit 701 has been set and also during an interval, when power is first applied to deflection system 100, control logic circuit 301 generates a control signal 904 that disables currents I1 and I2 to make each equal to zero regardless of the value of word 311a. Additionally, control logic circuit 301 generates a control signal 906 that turns on transistor 903 to decouple data words 311a from amplifier 610. Thereby, any excessive transient condition at an output of amplifier 610 is, advantageously, prevented. On the other hand, during normal operation, transistor 903 is turned off and currents I1 and I2 vary in accordance with words 311a. Similar protection arrangement is provided with respect to amplifier 660.

Additionally, if flag bit 701 has been set, because of detected parity bit error, data words 250a stored in memory 250 are automatically read out and transferred to memory 305. Data words 250a in memory 250 are parity error free because, during the aforementioned arc discharge, no read out process occurs simultaneously in memory 250. Thus, updated data words 311a and 312a in memory 305 are identical to those obtained, during factory set up. As a result, advantageously, a more acceptable image quality on screen 700 is obtained. Thereafter, duplicate data words to those stored in memory 250 are transferred to memory 550. As a result, data words 550a in memory 550 also become parity error free.

Re-adjustment of correction data words 550a in memory 550 may be required, for example, after the set has been relocated to a geographical location having a different value of the earth magnetic field from which existed, during factory set up. An alignment procedure may be employed when the set is serviced, during field service, or under user control for re-adjusting the data stored in memory 550. Advantageously, the words stored in memory 250 are used both for running the alignment procedure and for producing error free correction data words 550a in memory 550, as explained before.

What is claimed is:

1. A video display deflection apparatus, comprising:

means for generating a deflection field in a cathode ray tube to vary a beam landing location of an electron beam of said cathode ray tube;

a source of beam landing error correction data that are applied to said deflection field generating means for varying said deflection field by a variable amount that varies in accordance with said varying beam landing location;

a bit error detector for detecting data bit error in said beam landing error correction data; and means coupled in a signal path of said beam landing error correction data and responsive to an output signal of said bit error detector for decoupling said beam landing error correction data from said deflection field generating means to prevent said bit error from varying said deflection field.

2. A video display deflection apparatus according to claim 1, wherein said beam landing error correction data is coupled via a convergence amplifier to an auxiliary deflection winding.

3. A video display deflection apparatus, comprising:

a deflection winding for generating a deflection field in a cathode ray tube to vary a beam landing location of an electron beam of said cathode ray tube;

a source of beam landing error correction data that are applied to said deflection winding for varying said deflection field by a variable amount that varies in accordance with said varying beam landing location; and a bit error detector for detecting a data bit error in said beam landing error correction data, said bit error detector being coupled to a signal path of said beam landing error correction data for controlling a current in said deflection winding in accordance with an output signal of said bit error detector.

4. A video display deflection apparatus according to claim 3, wherein said beam landing error correction data is coupled via a convergence amplifier to an auxiliary deflection winding and wherein an output of said amplifier is decoupled from said auxiliary deflection winding in response to said data bit error.

5. A video display deflection apparatus according to claim 3 further comprising, a digital-to-analog converter for applying said correction data via said digital-to-analog converter to said deflection winding and wherein an output signal of said bit error detector is coupled to said digital-to-analog converter for disabling said digital-to-analog converter.

6. A video display deflection apparatus according to claim 3 wherein said correction data is decoupled from said deflection winding, during a power start-up interval.

* * * * *